United States Patent
Vucinic et al.

(10) Patent No.: US 12,189,532 B2
(45) Date of Patent: Jan. 7, 2025

(54) FAULT TOLERANCE AND COHERENCE FOR SHARED MEMORY

(71) Applicant: Western Digital Technologies, Inc., San Jose, CA (US)

(72) Inventors: Dejan Vucinic, San Jose, CA (US); Jaco Hofmann, Santa Clara, CA (US); Paul Loewenstein, Palo Alto, CA (US); Huynh Tu Dang, San Jose, CA (US); Marjan Radi, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/853,752

(22) Filed: Jun. 29, 2022

(65) Prior Publication Data

US 2024/0004795 A1    Jan. 4, 2024

(51) Int. Cl.
*G06F 12/08* (2016.01)
*G06F 11/30* (2006.01)
*G06F 12/0817* (2016.01)
*G06F 12/0837* (2016.01)
*G06F 12/084* (2016.01)

(52) U.S. Cl.
CPC ...... *G06F 12/0824* (2013.01); *G06F 11/3037* (2013.01); *G06F 12/0837* (2013.01); *G06F 12/084* (2013.01)

(58) Field of Classification Search
CPC ............ G06F 12/0824; G06F 11/3037; G06F 12/0837; G06F 12/084
See application file for complete search history.

(56) References Cited

U.S. PATENT DOCUMENTS

| | | | |
|---|---|---|---|
| 8,954,790 B2 | 2/2015 | Rangarajan et al. | |
| 9,280,478 B2 | 3/2016 | Sampathkumar | |
| 9,411,730 B1* | 8/2016 | Daly | G06F 12/0815 |
| 10,157,134 B2 | 12/2018 | Guthrie et al. | |
| 10,467,139 B2 | 11/2019 | Loewenstein et al. | |
| 11,175,984 B1* | 11/2021 | Lercari | G06F 11/0784 |
| 2020/0027514 A1* | 1/2020 | Miller | G11C 16/3495 |
| 2021/0232421 A1 | 7/2021 | Waddington et al. | |
| 2021/0382858 A1* | 12/2021 | Wang | G06F 3/0685 |
| 2022/0066876 A1* | 3/2022 | Yeung | G06F 11/3037 |

FOREIGN PATENT DOCUMENTS

| | | | |
|---|---|---|---|
| CN | 103914402 B | 8/2016 | |
| WO | WO-2016068870 A1 * | 5/2016 | G06F 12/06 |

* cited by examiner

*Primary Examiner* — Masud K Khan
(74) *Attorney, Agent, or Firm* — Barry IP Law, P.C.

(57) ABSTRACT

A system includes at least one memory controller that partitions at least one memory into a plurality of nodes. Blast zones are formed that each include a predetermined number of nodes. Cache lines are erasure encoded to be stored in one or more blast zones with at least two nodes in a blast zone storing respective portions of a cache line and at least one node in the blast zone storing a parity portion. In one aspect, it is determined that data stored in one or more nodes of a blast zone needs to be reconstructed and stored in one or more spare nodes designated to replace the one or more nodes. Erasure decoding is performed using data from one or more other nodes in the blast zone to reconstruct the data for storage in the one or more spare nodes.

20 Claims, 8 Drawing Sheets

1

FAULT TOLERANCE AND COHERENCE FOR SHARED MEMORY

BACKGROUND

Current trends in cloud computing, big data, and Input/Output (I/O) intensive applications have led to greater needs for large-scale systems that use one or more shared memories. In some systems, a shared memory can be accessed by multiple cores or processors via an interconnect between the shared memory and the processors. In other systems, the shared memory can be distributed across multiple memory devices that are accessed via an interconnect or network by processing devices. In both types of systems, the shared memory can serve as a main memory that can enable faster access to cache lines or data blocks that are expected to be more frequently accessed by the processors, cores, or processing devices, as compared to accessing the data from storage devices, such as Hard Disk Drives (HDDs), tape drives, or certain types of Solid-State Drives (SSDs).

Since multiple processors or processing devices in a shared memory system can access copies of the same data, a memory coherence protocol can be used to ensure that copies of the same data are coherent or consistent throughout the system. Memory coherence protocols typically assume accurate communication between the devices in the system and rely on redundant copies of the data stored in the memory to also be stored in storage devices for handling physical failures of system components, such as bad connectors or worn out memory devices. In addition, systems may use replay buffers or error correcting codes to correct or resend messages that may have errors due to errors in the interconnect or the network that may be caused by noise.

However, such conventional methods for fault tolerance are less practical for large-scale systems, such as supercomputers and data centers, due to the greater number of components that can fail and the increased frequency of unrecoverable message errors. For example, supercomputers or data centers may provide checkpointing by periodically copying an entire memory to a storage device, such as an HDD. In the case of failed memory regions in the memory, operation of the supercomputer may be halted while data from the failed memory regions are recovered from the checkpointed data in the storage device. Such halting of operations becomes more frequent as the size of the supercomputer or data center increases such that the performance of the overall system suffers. In addition, maintaining the coherency of data throughout large-scale systems becomes more difficult as the size of the system increases since there can be more copies of a greater number of cache lines being accessed by a greater number of processing devices.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
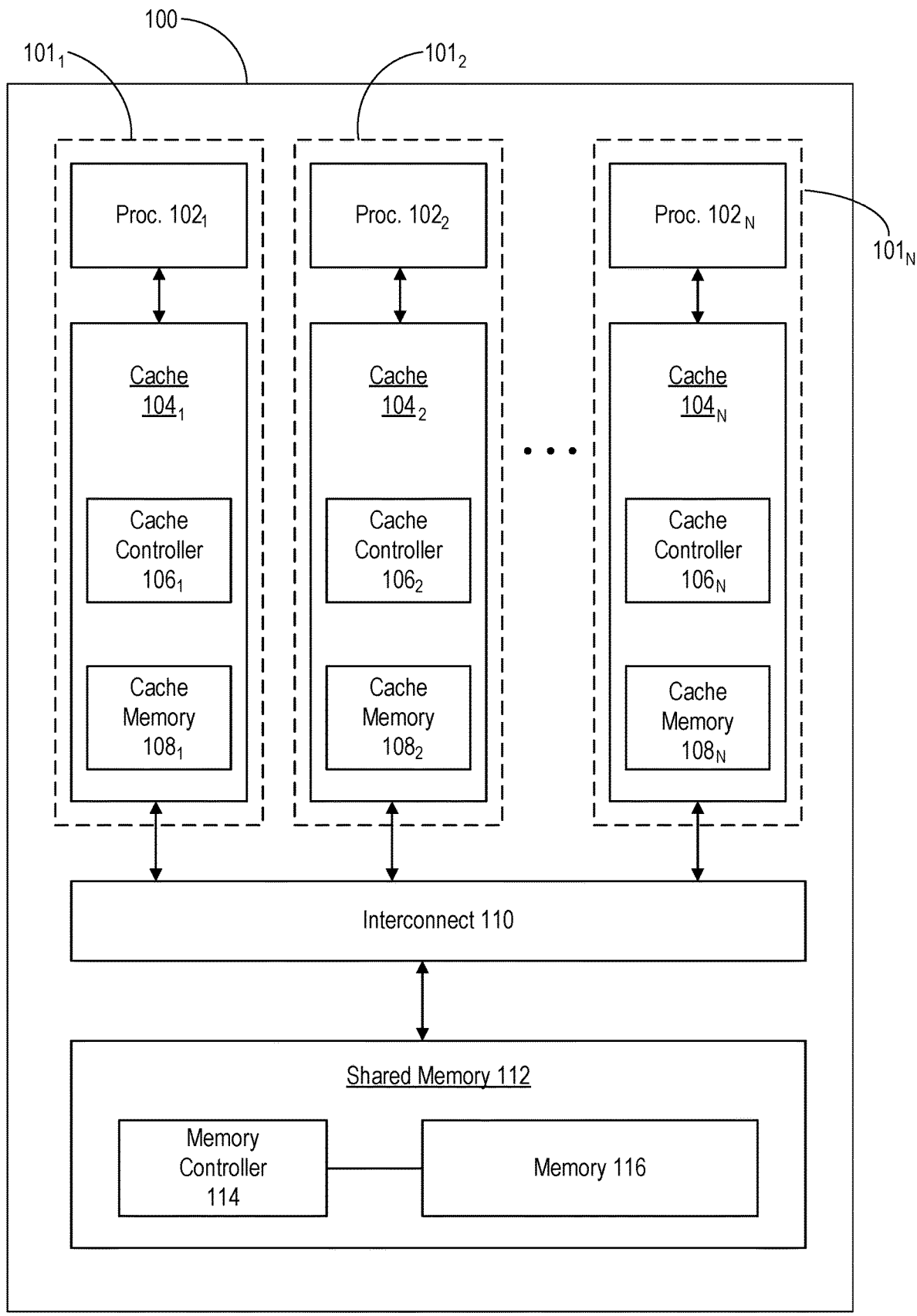
FIG. 1 is a block diagram of an example system including a shared memory for implementing memory fault tolerance and memory coherence according to one or more embodiments.

FIG. 1 is a block diagram of an example system for implementing memory coherence and memory fault tolerance according to one or more embodiments. System 100 in FIG. 1 may function as, for example, a multi-core computer, a System on a Chip (SoC), or a supercomputer that processes data stored in shared memory 112. As shown in FIG. 1, system 100 includes processors 102, caches 104, interconnect 110, and shared memory 112.

Each of processors $102_1$ to $102_N$ can include, for example, circuitry such as one or more RISC-V cores or other type of Central Processing Unit (CPU), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In this regard, each processor 102 may comprise a multi-core processor or each processor 102 can represent a single processing core. In some implementations, a processor 102 can include an SoC or other type of integrated processing system that includes a cache 104 to form a processing unit 101. In addition, each processor 102 can include one or more levels of cache memory not shown in FIG. 1, such as L1, L2, and/or L3 caches.

Processors $102_1$ to $102_N$ use respective caches $104_1$ to $104_N$ as a Last Level Cache (LLC) (e.g., an L2, L3, or L4 cache depending on the levels of cache included in the processor 102) that caches data blocks or cache lines that are requested by the processor 102 or expected to be accessed by the processor 102. Cache controllers 106 control the operation of their respective cache memories 108 to retrieve cache lines from shared memory 112 via interconnect 110 and store the retrieved cache lines in cache memory 108 for access by processor 102. In this regard, cache controllers 106 can retrieve cache lines from shared memory 112 based on commands received from its respective processor 102, and in some implementations, may also retrieve or prefetch additional cache lines that are expected to be used by processor 102.

Processors 102 and caches 104 can communicate with shared memory 112 via interconnect 110, which can include, for example, a Peripheral Component Interconnect express (PCIe) bus, a Network on a Chip (NoC), or another type of bus or network. In this regard, each cache 104 and shared memory 112 can include respective interfaces for communicating on interconnect 110.

Cache controllers 106 can follow a coherence protocol that is managed by memory controller 114 of shared memory 112. In addition, cache controllers 106 can perform certain fault tolerance operations disclosed herein, such as erasure encoding cache lines for storage in shared memory 112 and erasure decoding cache lines retrieved from shared memory 112. In some implementations, cache controllers 106 can include circuitry such as a hardware controller or other processing circuitry including hard-wired logic, analog circuitry and/or a combination thereof. Cache memories 108 can include, for example, Static Random Access Memory (SRAM), Magnetoresistive RAM (MRAM), or other high-speed RAM or Storage Class Memory (SCM). Cache controllers 106 can execute instructions, such as a firmware for managing cache memory 108 and for performing fault tolerance and coherency operations disclosed herein.

Memory controller 114 can include, for example, circuitry such as a hardware controller or other processing circuitry including hard-wired logic, analog circuitry and/or a combination thereof. Memory 116 can include, for example, Dynamic RAM (DRAM), or other solid-state memory, such as SCM, used as a main memory for system 100 that can be accessed by processors 102 via caches 104 for loading cache lines from memory 116 and storing cache lines in memory 116. The cache lines can have a fixed size for use by processors 102, such as a fixed number of bytes in the range of 16 bytes to 256 bytes.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 116 and/or cache memories 108 (or memories 216 and/or cache memories 208 in FIG. 2) may include an SCM, such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), MRAM, 3D-XPoint memory, and/or other types of solid-state memory, for example.

Memory controller 114 can execute instructions, such as a firmware for managing shared memory 112 and for performing certain fault tolerance and coherency operations disclosed herein. As discussed in more detail below, memory controller 114 can implement fault tolerance operations and coherency operations for data stored in regions of memory 116, referred to herein as "blast zones" and described in more detail below with reference to FIG. 3. Memory controller 114 can ensure the consistency or coherence of the copies of cache lines that are stored in memory 116 and in one or more cache memories 108 of caches 104 on a blast zone basis by serializing the performance of memory requests in the blast zone and tracking the state of the cache lines stored in the blast zone. In addition, memory controller 114 can ensure the fault tolerance of the cache lines on a blast zone basis by configuring each blast zone to include nodes that store respective data portions or parity portions of erasure encoded cache lines. Memory controller 114 may then replace nodes from the blast zones as needed from a rebuild pool of spare nodes in memory 116.

Those of ordinary skill in the art will appreciate with reference to the present disclosure that other implementations of system 100 can include different components or a different arrangement of components. For example, other implementations of system 100 can include multiple shared memories 112 or a different number of caches 104 with respect to the number of processors 102, such that there are more processors 102 than caches 104. In addition, those of ordinary skill in the art will recognize that system 100 of FIG. 1 is for the purposes of illustration, and that system 100 can include many more processors 102, shared memories 112, and/or cache memories 108 than shown in FIG. 1.

Figure 2:
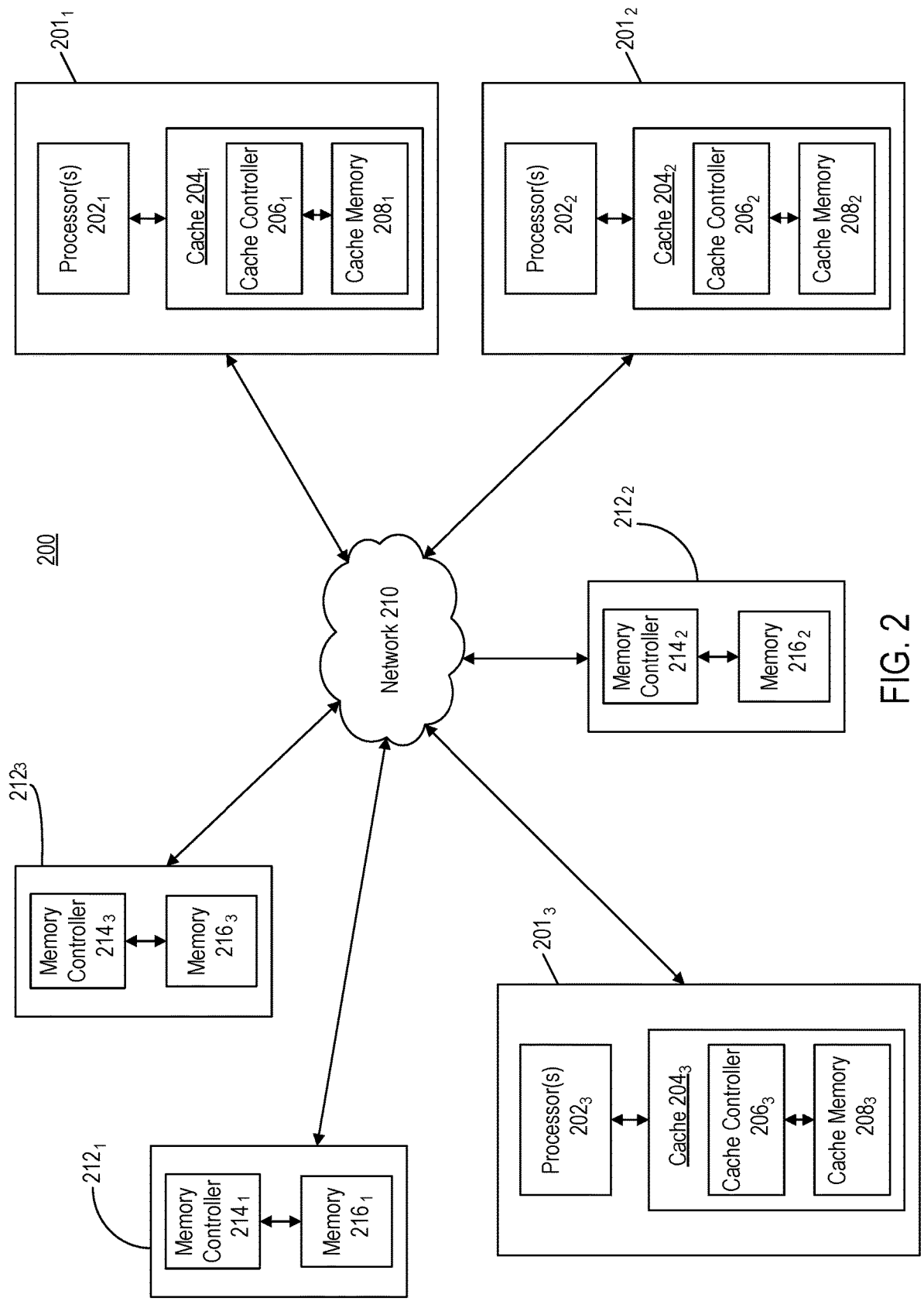
FIG. 2 is a block diagram of an example distributed system for implementing memory fault tolerance and memory coherence according to one or more embodiments.

FIG. 2 is a block diagram of an example distributed system for implementing memory fault tolerance and memory coherence according to one or more embodiments. As shown in FIG. 2, system 200 includes processing units $201_1$ to $201_3$ and memory units $212_1$ to $212_3$. Unlike system 100 in FIG. 1, distributed system 200 in FIG. 2 includes separate memory units 212 that each include a memory 216 that is shared among the processing units 201 via network 210 as a main memory of system 200.

In some implementations, system 200 in FIG. 2 may be used as at least part of a data center or supercomputer for distributed processing, such as for distributed machine learning or big data analysis. As will be appreciated by those of ordinary skill in the art, processing units 201 and memory units 212 are shown for the purposes of illustration, and distributed system 200 can include many more processing units 201 and/or memory units 212 than those shown in FIG. 1. In addition, those of ordinary skill the art will appreciate that system 200 can include more components than shown in FIG. 1, such as aggregated switches, Top of Rack (ToR) switches, and network controllers, for example.

Network 210 can include, for example, a Storage Area Network (SAN), a Local Area Network (LAN), and/or a Wide Area Network (WAN), such as the Internet. In this regard, processing units 201 and/or memory units 212 may not be in the same geographic location. Processing units 201 and memory units 212 may communicate using one or more standards such as, for example, Ethernet.

Each processing unit 201 in the example of FIG. 1 includes one or more processors 202 and a cache 204. These components of processing units 201 may communicate with each other via a bus, which can include, for example, a PCIe bus, or other type of interconnect, such as an NoC. In addition, each of processing units 201 can include a network interface for communicating on network 210, such as a Network Interface Card (NIC), network interface controller, or network adapter.

Processors 202 can include, for example, circuitry such as one or more RISC-V cores or other type of CPU, a GPU, a microcontroller, a DSP, an ASIC, an FPGA, hard-wired logic, analog circuitry and/or a combination thereof. In this regard, each processor 202 may comprise a multi-core processor or each processor 202 can represent a single processing core. In some implementations, a processor 202 can include an SoC or other type of integrated processing system, which may be combined with a cache 204. In addition, each of processors 202 can include one or more levels of cache memory not shown in FIG. 2, such as L1, L2, and/or L3 caches.

Processors $202_1$ to $202_3$ use respective caches $204_1$ to $204_3$ as an LLC (e.g., an L2, L3, or L4 cache depending on the levels of cache included in the processor(s) 202) that caches data blocks or cache lines that are requested by the processor(s) 202 or expected to be accessed by the processor(s) 202. Cache controllers 206 control the operation of their respective cache memories 208 to retrieve cache lines from memory units 212 via network 210 and store the retrieved cache lines in cache memory 208 for access by processor(s) 202. In this regard, cache controllers 206 can retrieve cache lines from memory units 212 based on commands received from its respective processor or processors 202, and in some implementations, may also retrieve or prefetch additional cache lines that are expected to be used by the processor(s) 202.

Cache controllers 206 can follow a coherence protocol that is managed by memory controllers 214 of memory units 212. In addition, cache controllers 206 can also perform certain fault tolerance operations disclosed herein, such as erasure encoding cache lines for storage in memories 216 of memory units 212 and erasure decoding cache lines retrieved from memories 216. In some implementations, cache controllers 206 can include circuitry such as a hardware controller or other processing circuitry including hard-wired logic, analog circuitry and/or a combination thereof. Cache memories 208 can include, for example, SRAM, MRAM, or other high-speed RAM or SCM. Cache controllers 206 can execute instructions, such as a firmware for managing cache memory 208 and for performing certain fault tolerance and coherency operations disclosed herein.

As shown in the example of FIG. 2, each memory unit 212 includes a memory controller 214 and a memory 216. In addition, each memory unit 212 can include a network interface for communicating on network 210, such as a NIC, network interface controller, or network adapter.

Memory controllers 214 of memory units 212 can include, for example, circuitry such as a hardware controller or other processing circuitry including hard-wired logic, analog circuitry and/or a combination thereof. Memories 216 of memory units 212 can include, for example, DRAM or other solid-state memory, such as SCM, used as a shared memory for distributed system 200 that can be accessed by processors 202 of processing units 201 via caches 204 for loading cache lines from memories 216 and storing cache lines in memories 216. In this regard, memories 216 may collectively serve as a main memory for distributed system 200. The cache lines can have a fixed size for use by processors 202, such as a fixed number of bytes in the range of 16 bytes to 256 bytes.

As discussed in more detail below, memory controllers 214 can implement fault tolerance operations and coherence operations for data stored in regions of their respective memories 216, referred to herein as blast zones. Memory controllers 214 can ensure the consistency or coherence of the copies of cache lines that are stored in its respective memory 216 and in one or more cache memories 208 of caches 204 on a blast zone basis by serializing the performance of memory requests in the blast zone and tracking the state of the cache lines stored in the blast zone. In addition, memory controllers 214 can ensure the fault tolerance of the cache lines on a blast zone basis by configuring each blast zone to include nodes that store a respective data portion or parity portion of erasure encoded cache lines. Memory controllers 214 may then replace nodes from the blast zones as needed from a rebuild pool of spare nodes in its associated memory 216.

Those of ordinary skill in the art will appreciate with reference to the present disclosure that other implementations may include a different number or arrangement of processing units 201 and memory units 212 than shown in the example of FIG. 2. In this regard, distributed system 200 shown in FIG. 1 is for the purposes of illustration and those of ordinary skill in the art will appreciate that system 200 may include many more processing units 201 and/or memory units 212, and additional components, such as routers and switches.

Figure 3:
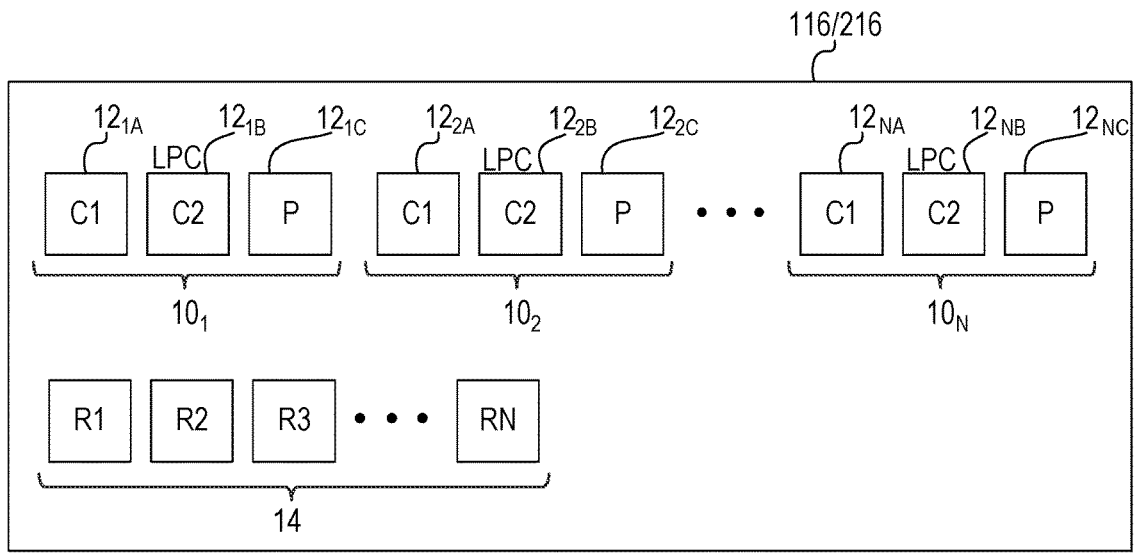
FIG. 3 provides an example arrangement of memory according to one or more embodiments.

FIG. 3 provides an example configuration of memory 116 from FIG. 1 or of a memory 216 from a memory unit 212 in FIG. 2 according to one or more embodiments. As shown in FIG. 3, the memory has been partitioned into physical sub-regions of the memory (i.e., "nodes"), including active nodes 12 and spare nodes in a rebuild pool 14. Blast zones $10_1$ to $10_N$ are formed to include a predetermined number of active nodes 12 that are mapped to the blast zone in a logical to physical mapping of the memory 116 or 216. The mapping can include, for example, routing tables or other data structures that indicate physical locations for the nodes in each blast zone.

The mapping of the nodes is logical in the sense that the nodes 12 of a particular blast zone 10 need not be physically adjacent to each other. Although the blast zones in some implementations may include physically adjacent nodes, other implementations may benefit from having nodes that are physically dispersed throughout the memory for better fault tolerance. In the example of FIG. 3, each blast zone 10 includes three nodes, but other implementations may include more nodes depending on the desired level of redundancy or error correction of the cache lines stored in the blast zones.

In the example of FIG. 3, each blast zone 10 includes two data portion nodes C1 and C2 and one parity portion node P. Each active node 12 in the blast zone 10 stores erasure encoded portions of cache lines. For example, a cache line can be split into two data portions that are stored in nodes $12_{1A}$ and $12_{1B}$, respectively, of blast zone $10_1$. A parity portion of the cache line can be stored in node $12_{1C}$. The parity portion of the cache line can include, for example, an XOR operation performed on the two data portions of the cache line stored in nodes $12_{1A}$ and $12_{1B}$. If one of the portions of the cache line cannot be recovered, such as due to the failure of a node, the missing portion of the cache line can be reconstructed by erasure decoding the missing portion using the other two portions of the cache line.

The size of each blast zone 10 can be based at least in part on the time it takes to read data from an entire storage capacity of the blast zone or a time it takes to write data to the entire storage capacity of the blast zone. This may be referred to as an "access density" of the blast zone. For example, 16 gigabytes (GB) of DRAM may have an access density of 1.6 seconds to fully write its 16 GB of storage capacity, while a 1 terabyte (TB) HDD may have an access density of approximately an hour to fully write its 1 TB of storage capacity. In some implementations, the blast zones may be sized to have an access density of approximately 1 millisecond (ms). The size of the blast zones can be set so that the access density, which can correspond to the time it takes to reconstruct data stored in one or more failed nodes 12 of the blast zone, is short enough to facilitate pausing or deferring new memory requests in the blast zone while the data is reconstructed. This independent handling of relatively smaller sized blast zones, as compared to the total size of the memory, can greatly simplify the preservation of consistency or coherence of the cache lines stored in the blast zone while one or more nodes in the blast zone are being rebuilt.

The rebuild operation for the blast zone can be triggered in response to a timeout value being reached in attempting to access data by a cache controller 106 of a cache 104 in FIG. 1 or a cache controller 206 of a memory unit 201 in FIG. 1. In some implementations, the cache 104 or 204 may send a message to the shared memory 112 or memory unit 212 if it is not able to repair the missing data within a timeout value (e.g., 1 ms). The repair attempts by the cache 104 or 204 can include, for example, requesting the missing or corrupted data again or using Error Correcting Code (ECC) that may be included with a packet received from the shared memory 112 or memory unit 212 to correct flipped bits in the message.

In other cases, a rebuild operation for a blast zone can be triggered in response to a failure in reading or writing the data in one or more nodes 12 of the blast zone 10, such as after performing a predetermined number of write or read retries that may correspond to a timeout value. Memory controller 114 in FIG. 1 or a memory controller 214 in FIG. 2 may also initiate the rebuild operation in response to one or more nodes reaching a usable life expectancy indicated by, for example, a number of read or write operations performed in the node, a latency in accessing data in the node, an error rate for data retrieved from or stored in the node, and/or a change in threshold voltages used to read or write data in the node.

If the memory controller determines that the data stored in one or more nodes 12 needs to be reconstructed, the memory controller can pause or defer new requests to access data in the blast zone, which may be tracked in some implementations in a buffer of shared memory 112 or memory unit 212.

The memory controller designates one or more corresponding spare nodes (i.e., nodes R1 to RN in FIG. 3) from rebuild pool 14 in the memory 116 or 216 to replace the one or more nodes from the blast zone to be rebuilt. The selection of the spare nodes can be serialized from a head of rebuild pool 14 so that a first spare node R1 is designated to replace a first failed node 12, and subsequent requests to replace the same first failed node 12 are ignored. The designation may be accomplished, for example, by changing the mapping for the blast zone from the node being replaced to the new spare node.

As discussed below in more detail with reference to the rebuild sequence of FIGS. 6A and 6B, the memory controller can recruit caches 104 or 204 that have requested cache lines from the blast zone to reconstruct the data to be stored in the newly designated node for the blast zone. This can include, for example, the memory controller sending the remaining portions of a cache line to the cache 104 or 204 to erasure decode the missing data and return the missing data portion or parity portion to the shared memory 112 or memory unit 212. As used herein, erasure decoding can include calculating a missing data portion or parity portion, such as by performing an XOR operation on the other portions or a subset of the other portions of the cache line.

As shown in FIG. 3, one node of each blast zone 10 serves as a Lowest Point of Coherence (LPC) for the cache lines stored in the blast zone by tracking a state of each cache line stored in the blast zone. The LPC node, such as nodes 121B, 122B, and 12NB in FIG. 3 can store the states for the cache lines in the blast zone, such as by including an additional entry or field in its cache line portion for the state of the cache line. In other implementations, the LPC node may include a separate data structure for storing the states of the cache lines.

The states can indicate a status or permission level for different copies of the cache line being accessed by one or more caches 104 or 204. Example states of cache lines can include, for example, a shared state for cache lines that are being accessed by one or more caches 104 or 204 that have a read-only access for the cache line, an exclusive state for cache lines that are being accessed by a cache 104 or 204 that has permission to modify the cache line, a modified state for cache lines that have been modified by a cache 104 or 204 and not yet returned to the memory 116 or 216 (i.e., "dirty" data), a valid state indicating that the cache line stored in the memory 116 or 216 is not being accessed by a cache 104 or 204, and/or an invalid state indicating that the cache line stored in the memory 116 or 216 may not be the most current version of the cache line if it is being accessed by a cache 104 or 204 in an exclusive or modified state. The LPC node in some implementations may also track which cache 104 or 204 currently has access to the cache line and its associated status for the cache line.

As will be appreciated by those of ordinary skill in the art with reference to the present disclosure, other implementations may use different states for maintaining the coherence of the cache lines stored in memory 116 or 216. For example, the state of the cache line at one or more caches 104 or 204 and/or in the blast zone may be inferred by a single state indicated in the LPC node. The state of the cache line in the blast zone may be inferred as shared when other copies of the cache line are shared at one or more caches 104 or 204 or if there are no caches 104 or 204 with access to a copy of the cache line. Similarly, the state of the cache line in the memory may be invalid when there is another copy of the cache line at a cache 104 or 204 in a modified or exclusive state.

Those of ordinary skill in the art will also appreciate with reference to the present disclosure that other implementations of memory 116 or 216 may differ. For example, each blast zone 10 may include more data portion nodes and/or more parity portion nodes to provide higher levels of fault tolerance.

Example Processes

Figure 4:
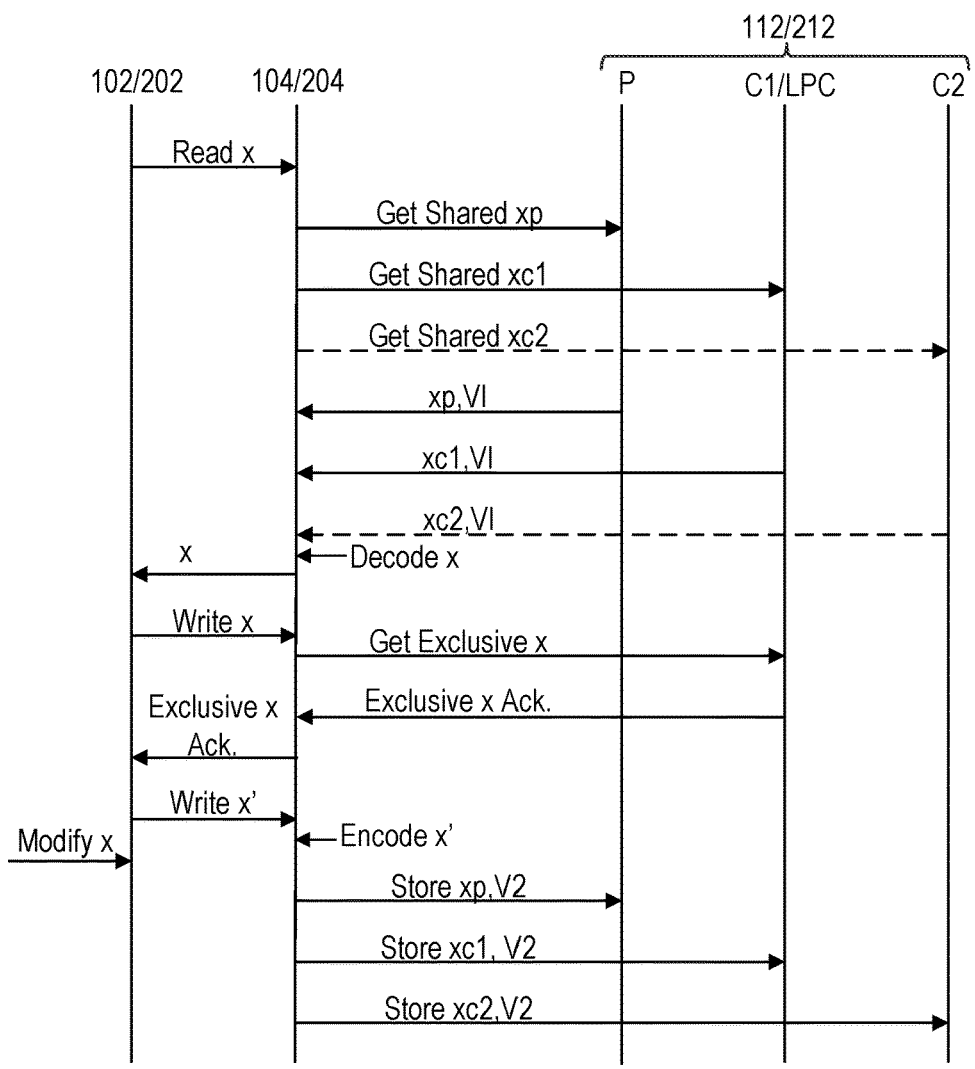
FIG. 4 is a sequence diagram for a read/write sequence according to one or more embodiments.

FIG. 4 is a sequence diagram for a read/write operation in a blast zone according to one or more embodiments. In the example sequence of FIG. 4, a read request is sent for cache line x from a processor 102 or 202 to its LLC 104 or 204. In response, the cache 104 or 204 sends a request to read a parity portion of cache line x (i.e., "Get Shared xp" in FIG. 4) to shared memory 112 or memory unit 212, which is directed to a parity node of the blast zone storing the cache line (i.e., "P" in FIG. 4). The cache 104 or 204 also sends a get shared request for a data portion of cache line x (i.e., "Get Shared xc1" in FIG. 4) to shared memory 112 or memory unit 212, which is directed to the data portion node of the blast zone that serves as the LPC (i.e., C1/LPC in FIG. 4). In some implementations, the cache 104 or 204 may also optionally send a get shared request that is directed to a second data portion node that is not the LPC in attempt to receive the two data portions needed to decode the cache line sooner if the data portion from the other node arrives quicker. This is indicated by the first dashed arrow in FIG. 4 from cache 104 or 204 to node C2. In other implementations, the sending of the additional get shared request may be omitted in favor of conserving packet processing resources and bandwidth on the interconnect or network.

As noted above with reference to FIG. 3, other implementations may include a different number of data portions and/or parity portions in the blast zone. In such implementations, at least one request is directed to the LPC node, which may be a parity node or a data node, and at least as many additional requests are sent as are needed for reconstructing the full cache line, which will depend on the level of redundancy used by the erasure code. In addition, other implementations may not require the cache 104 or 204 to send separate requests to the shared memory 112 or memory unit 212 for each data and/or parity portion. In such implementations, the memory controller or other circuitry of the shared memory 112 or memory unit 212 may be responsible for directing the performance of the access requests to the relevant nodes for the cache line.

Shared memory 112 or memory unit 212 sends the parity portion from the parity node and a first data portion from the LPC node. Shared memory 112 or memory unit 212 may also optionally send extra data or parity portions that may have been additionally requested for speeding up the receipt of the portions in some implementations, as indicated by the dashed arrow from node C2 to cache 104 or 204 in FIG. 4. The data portion(s) and/or parity portion(s) may be sent as separate packets as shown in the sequence of FIG. 4 or may be sent together as a single packet in some implementations.

A version or sequence number is included with each portion of the cache line sent to the cache 104 or 204. The cache controller can compare the version numbers from the different portions for the same cache line to ensure that all the received portions are for the same version of the cache line. For example, a higher version number for the portion received from the LPC node than for a portion received from another node can indicate that the other node may not have committed or stored its portion of the latest version of the cache line. In such an example, the cache 104 or 204 may then request that the portion is resent until reaching a timeout value, which may trigger a rebuild process for the other node, as discussed in more detail below with reference to FIGS. 6A and 6B.

A cache controller of the cache 104 or 204 may then perform erasure decoding to reconstruct the cache line x before sending it to the processor 102 or 202 to complete the read request received from the processor by the cache controller at the beginning of the sequence. At this point in the example of FIG. 4, the processor 102 or 202 decides to modify cache line x so it now requests the cache 104 or 204 to obtain an exclusive permission or state to modify cache line x. In response, the cache controller for the cache 104 or 204 sends a "Get Exclusive x" request to the shared memory 112 or memory unit 212. The memory controller directs the request to the LPC node of the blast zone that stores cache line x to determine if any other copies of cache line x need to be invalidated and to update the state for cache line x to indicate that it is in an exclusive state for the processor 102 or 202. In this regard, the coherence protocol of the present disclosure may be considered a permissive protocol in that memory requests are generally granted in the order in which they are received.

After updating the state of cache line x in the LPC node, the shared memory 112 or memory unit 212 returns an acknowledgement to the cache 104 or 204 granting exclusive access to modify cache line x (i.e., "Exclusive x Ack." in FIG. 4). The cache 104 or 204 then notifies the processor 102 or 202 of the change in status for cache line x. After modifying cache line x, the processor 102 or 202 sends a write command to the cache 104 or 204 to store the modified cache line x' in memory.

In response, a cache controller of cache 104 or 204 can erasure encode the modified cache line x' and sends the data portions and parity portion to shared memory 112 or memory unit 212 with an incremented version number indicating that the cache line has been modified, which can be updated in the LPC node. As used herein, erasure encoding can include splitting a cache line into data portions and calculating one or more parity portions from the data portions, such as by performing an XOR operation on the data portions.

Figure 5:
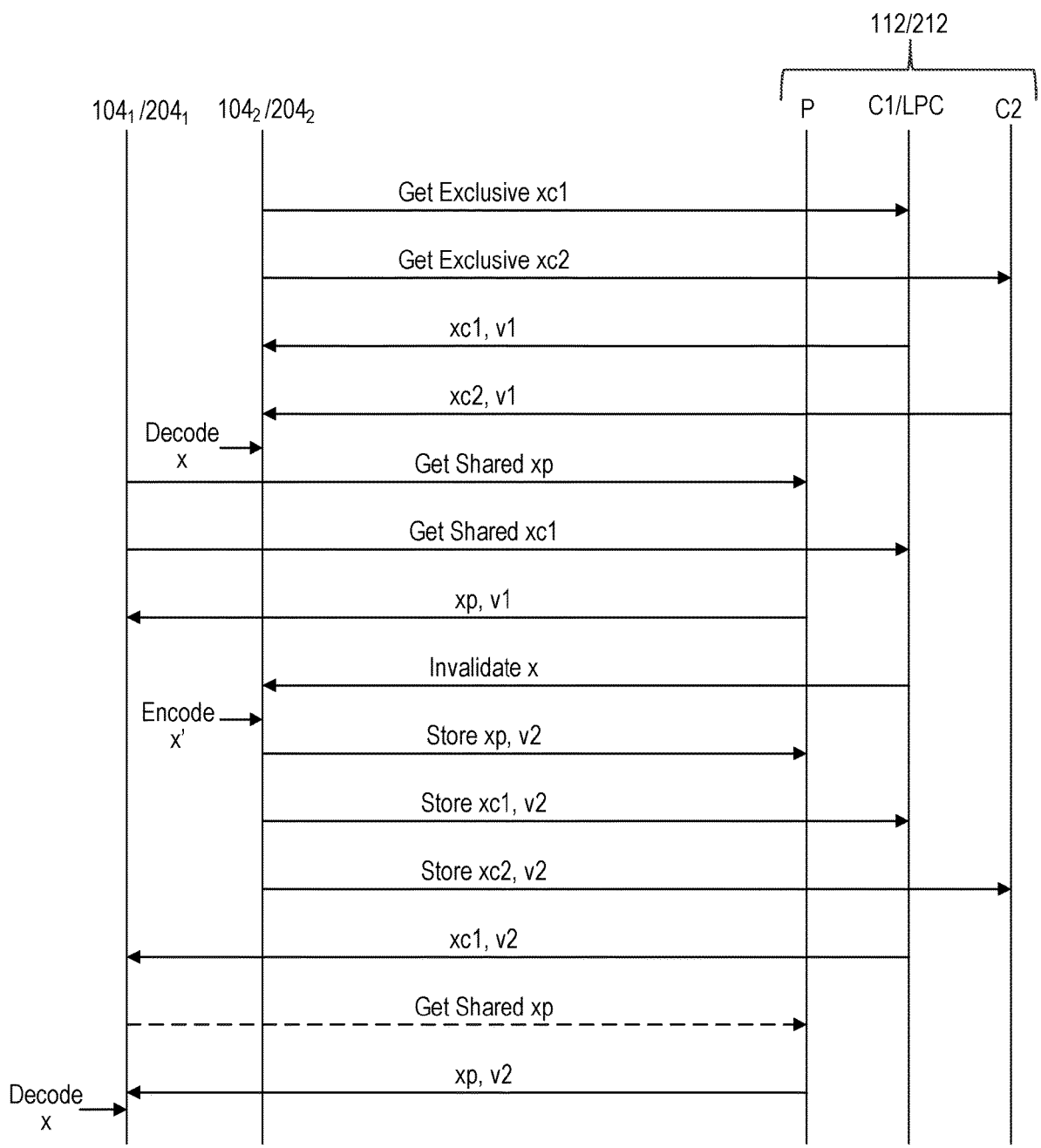
FIG. 5 is a sequence diagram for a contention resolution sequence according to one or more embodiments.

FIG. 5 is a sequence diagram for a contention resolution sequence in a blast zone according to one or more embodiments. As shown in the example of FIG. 5, a cache $104_2$ or $204_2$ sends requests to obtain exclusive permission to modify cache line x and requests two data portions of the cache line from the LPC node (i.e., C1/LPC in FIG. 5) and a second data portion node (i.e., C2 in FIG. 5). Shared memory 112 or memory unit 212 responds with the data portions with indications of the versions of the data portions for cache line x (i.e., "xc1, v1" and "xc2, v1" in FIG. 5). The cache controller of cache $104_2$ or $204_2$ erasure decodes the data portions, such as by appending the data portions, to form cache line x for processing.

A different cache $104_1$ or $204_1$ then sends requests to obtain a shared access to cache line x by requesting the parity portion from the parity node of the blast zone and a data portion from the LPC node of the blast zone (i.e., "Get Shared xp" and "Get Shared xc1" in FIG. 5). The parity portion xp is returned to the cache $104_1$ or $204_1$, but no response is sent from the LPC node since the state in the LPC node indicates that cache $104_2$ or $204_2$ already has exclusive access to cache line x. Instead, an invalidate message is sent from the LPC node (i.e., "Invalidate x") to return the copy of cache line x to the blast zone so that cache line x can be shared with cache $104_1$ or $204_1$. In other implementations, the LPC node may alternatively send a "probe" request to have cache line x returned to the blast zone.

In response, the cache controller for cache $104_2$ or $204_2$ erasure encodes its copy of cache line x, which has been modified (i.e., "Encode x" in FIG. 5). The cache controller for cache $104_2$ or $204_2$ then stores the data portions and parity portion resulting from the erasure encoding in the different nodes of the blast zones with an incremented version number indicating that the cache line has been modified. The LPC node for the blast zone updates the version number and provides its data portion for the new version of cache line x to cache $104_1$ or $204_1$.

In some implementations, the memory controller may then send the parity portion for the new version of cache line x to the cache $104_1$ or $204_1$ to replace the outdated version previously sent from the parity node of the blast zone without an additional request from cache $104_1$ or $204_1$ for the updated version. In other implementations, the receipt of the new version of the data portion from the LPC node with the higher version number can trigger the cache controller for cache $104_1$ or $204_1$ to send a new get shared request for the parity portion, as indicated by the dashed arrow in FIG. 5. The cache controller then performs erasure decoding on the new portions of the cache line to reconstruct the cache line for processing.

Figure 6A:
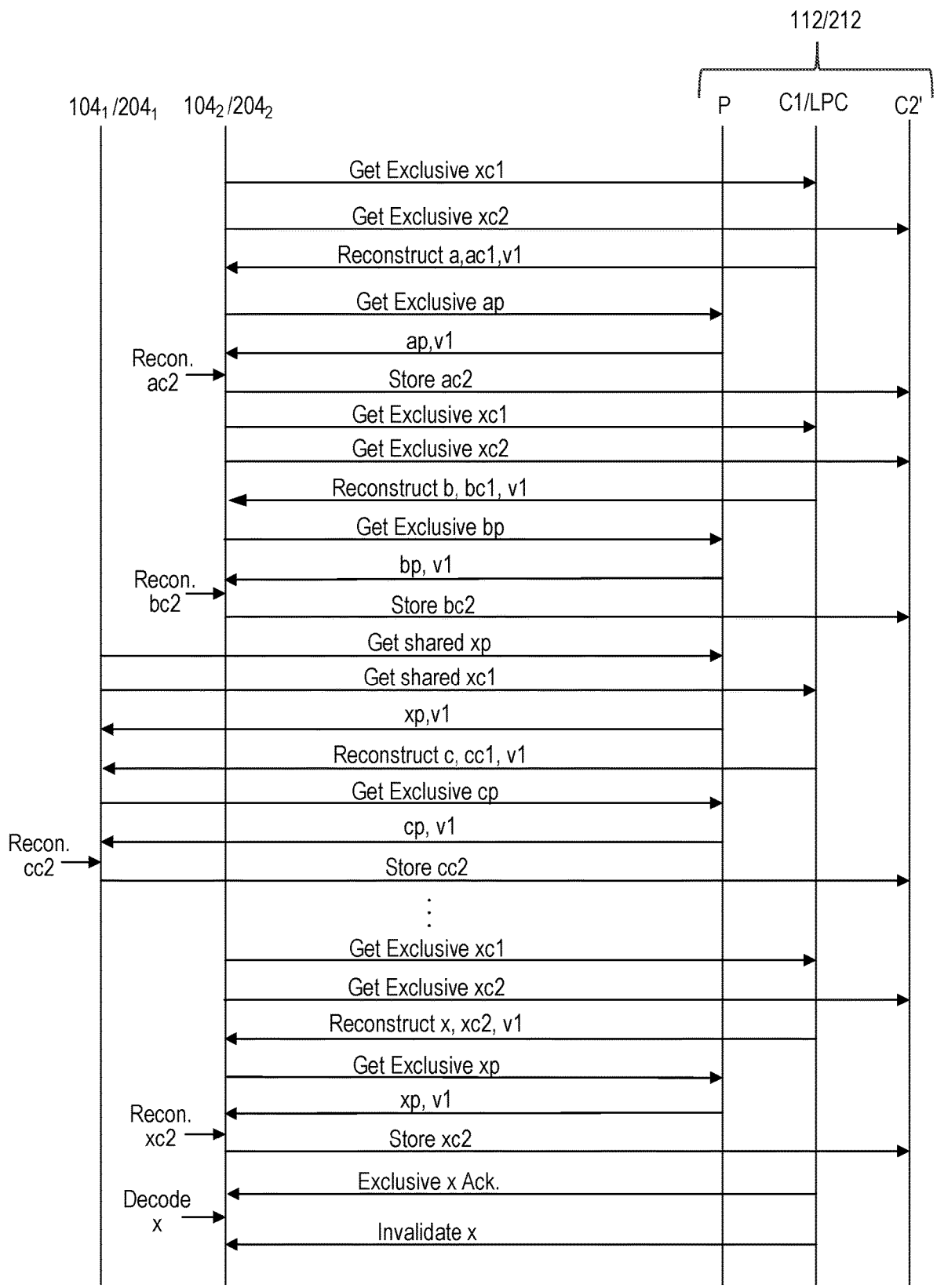
FIG. 6A is a first part of a sequence diagram for a rebuild sequence according to one or more embodiments.
Figure 6B:
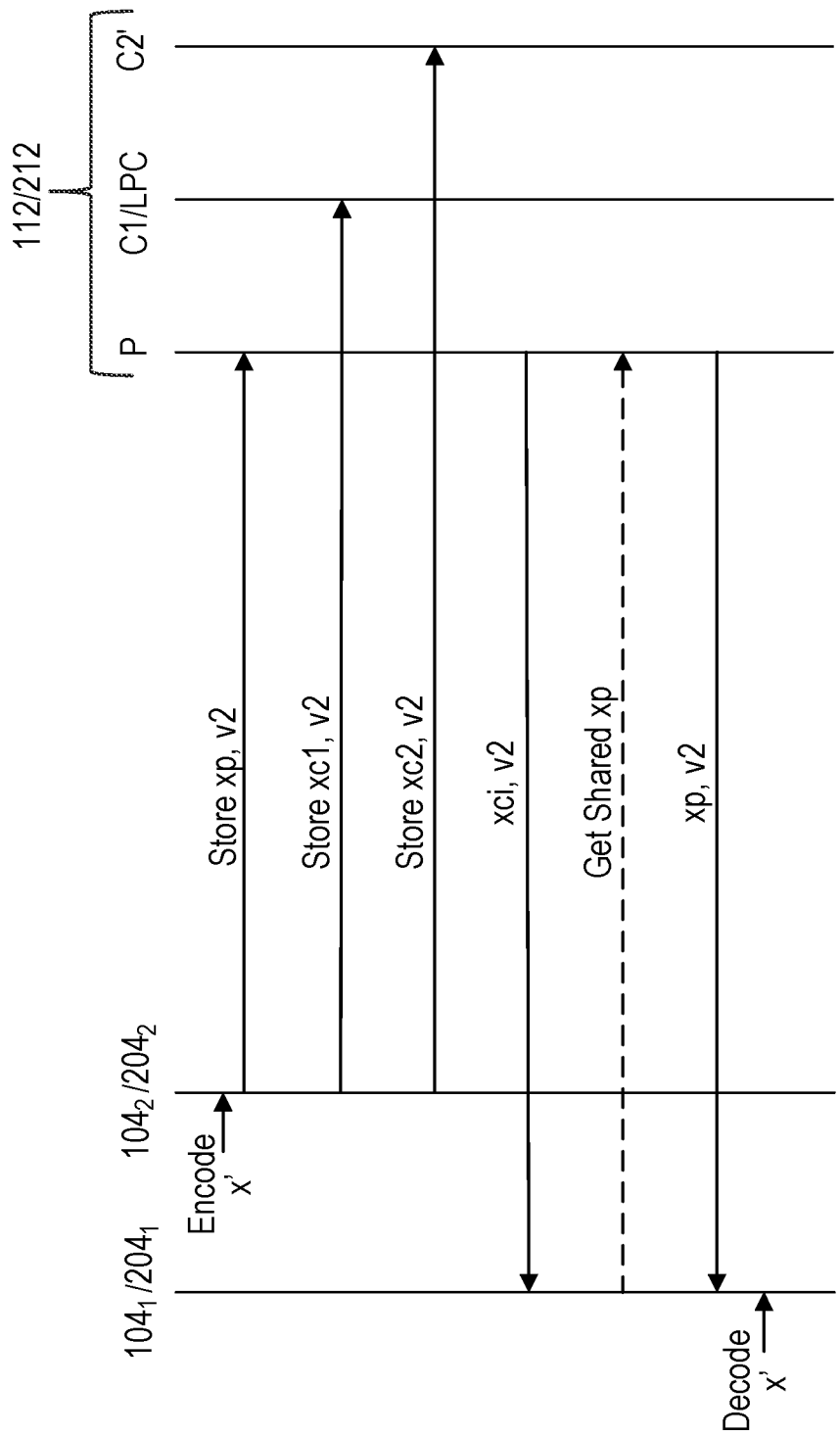
FIG. 6B is a second part of the sequence diagram for the rebuild sequence from FIG. 6A according to one or more embodiments.

FIGS. 6A and 6B provide a sequence diagram for a rebuild sequence in a blast zone according to one or more embodiments. In the example sequence of FIGS. 6A and 6B, a cache $104_2$ or $204_2$ requests exclusive access to a cache line x by sending a get exclusive request for a first data portion xc1 from the LPC node of the blast zone and sending a get exclusive request for a second data portion xc2 from another data node, C2, of the blast zone. However, the data node C2 has recently been replaced by a spare node C2' from a rebuild pool of shared memory 112 or memory unit 212 and is in the process of being rebuilt.

As discussed in more detail below with reference to FIG. 8, the rebuild process may begin in some implementations with the memory controller for the shared memory 112 or memory unit 212 broadcasting invalidate messages for the data portions stored in the node being rebuilt. In cases like the example of FIG. 6A where the node being rebuilt is not the LPC node for the blast zone, the version numbers of any copies of the portions received from caches that were accessing the cache line can be compared to the state for the cache line in the LPC node. If the cache sending the cache line portion matches the cache indicated as having access to the cache line in the state stored in the LPC node, the memory controller may use the received cache line portion by storing the received portion in the replacement node and the reconstruction of that data portion can be skipped.

On the other hand, if the LPC node needs to be rebuilt, each cache line portion stored in the LPC node can be first reconstructed using erasure coding before proceeding with using any received data portions that were being accessed by caches. In other implementations, the storing of dirty data for a cache line in the blast zone may instead proceed after a portion for the cache line has been stored in the new node without having to wait for all the remaining cache line portions to be reconstructed and stored in the new node.

In the example of FIG. 6, the memory controller of shared memory 112 or memory unit 212 defers performance of the request for cache line x and recruits the requesting cache $104_2$ or $204_2$ to help reconstruct data to be stored in the new data node C2' by sending a message to cache $104_2$ or $204_2$ to reconstruct a data portion for a different cache line a (i.e., "Reconstruct a, ac1, v1" in FIG. 6A). The reconstruct message can include the data portion from the LPC (i.e., "ac1") and a version number for the cache line portion.

In response, cache $104_2$ or $204_2$ sends a get exclusive request for the parity portion of the cache line a from the parity node in the blast zone. In implementations that may require a greater number of portions to reconstruct the data portion, the cache $104_2$ or $204_2$ would send additional get exclusive requests to obtain enough portions to reconstruct the data portion. After receiving the parity portion for cache line a, the cache controller erasure decodes the data portion for cache line a to be stored in node C2' (i.e., "ac2"). The cache $104_2$ or $204_2$ then sends the reconstructed data portion for storage in the new node C2' of the blast zone.

By recruiting caches attempting to access data from the blast zone being rebuilt, the performance impact of rebuilding is reduced since the requesting cache would otherwise need to wait for the blast zone to finish being rebuilt before proceeding with the requested cache line. In addition, and as noted above, the size of the blast zone can be small enough so as not to impose an unacceptable delay for the system (e.g., in terms of Quality of Service (QoS)) in reconstructing the data stored in or one or more nodes of the blast zone.

Cache $104_2$ or $204_2$ attempts again to request exclusive access to cache line x by sending a get exclusive request for the first data portion xc1 from the LPC node and sending a get exclusive request for the second data portion xc2 from node C2'. However, a reconstructed copy of the second data portion xc2 has not been stored in node C2' yet.

The memory controller of shared memory 112 or memory unit 212 can ignore the resent request for cache line x and recruits the requesting cache $104_2$ or $204_2$ to help reconstruct a data portion for another cache line b to be stored in data node C2' by sending a reconstruct message to cache $104_2$ or $204_2$ to reconstruct the data portion with the data portion from the LPC node (i.e., "bc1") and a version number for the cache line portion.

In response, cache $104_2$ or $204_2$ sends a get exclusive request for the parity portion of cache line b from the parity node in the blast zone. After receiving the parity portion for cache line b, the cache controller erasure decodes the portion of cache line b to be stored in node C2' (i.e., "bc2"). The cache $104_2$ or $204_2$ then sends the reconstructed data portion for storage in the new node C2' of the blast zone.

A different cache $104_1$ or $204_1$ then requests shared access to cache line x by sending get shared requests for a parity portion and a data portion of cache line x to nodes P and C1 of the blast zone. The parity node in the example of FIG. 6A returns the parity portion of cache line x (i.e., "xp"), but the LPC node returns a reconstruct message for the data portion of node C2' since this data portion has not yet been reconstructed and stored in node C2'.

The memory controller of shared memory 112 or memory unit 212 defers the new get shared request for cache line x and recruits the requesting cache $104_1$ or $204_1$ to help reconstruct a data portion for another cache line c to be stored in data node C2' by sending a reconstruct message to cache $104_1$ or $204_1$ to reconstruct the data portion with the data portion from the LPC node (i.e., "cc1") and a version number for the cache line portion.

In response, cache $104_1$ or $204_1$ sends a get exclusive request for the parity portion of cache line c from the parity node in the blast zone. After receiving the parity portion for cache line c, the cache controller of cache $104_1$ or $204_1$ reconstructs the portion of cache line c to be stored in node C2' (i.e., "cc2"). The cache $104_1$ or $204_1$ then sends the reconstructed data portion for storage in the new node C2' of the blast zone.

The new node C2' continues to be rebuilt in FIG. 6A with reconstructed data portions from requesting caches and the rebuilding of node C2' reaches the data portion for cache line x. Cache $104_2$ or $204_2$ again requests exclusive access to cache line x by sending a get exclusive request for the first data portion xc1 from the LPC node and sending a get exclusive request for the second data portion xc2 from node C2'. The shared memory 112 or memory unit 212 sends a reconstruct message for cache line x including the data portion from the LPC node, xc1, and a version number for cache line x.

In response, cache $104_2$ or $204_2$ sends a get exclusive request for the parity portion of cache line x from the parity node in the blast zone. After receiving the parity portion for cache line x, the cache controller reconstructs the portion of cache line x to be stored in node C2' (i.e., "xc2"). The cache $104_2$ or $204_2$ then sends the reconstructed data portion for storage in the new node C2' of the blast zone.

After cache line x has been reconstructed, the memory controller in some implementations may then resume performance of the deferred get exclusive memory request from cache $104_2$ or $204_2$ by sending an acknowledgment to grant the exclusive state of the cache line x stored by cache $104_2$ or $204_2$ (i.e., "Exclusive x Ack." in FIG. 6A), even though all of the portions may not have been stored yet in C2'. A cache controller of cache $104_2$ or $204_2$ may then decode the locally stored erasure encoded portions of cache line x, such as by appending the data portions for xc1 and xc2, for processing by a processor associated with cache $104_2$ or $204_2$.

In the example of FIG. 6A, the next deferred memory request for cache line x is then resumed after granting the exclusive access to cache line x. As a result, shared memory 112 or memory unit 212 sends an invalidate message to cache $104_2$ or $204_2$ to return its copy of cache line x (which may or may not have been modified) to perform the deferred get shared request from cache $104_1$ or $204_1$ for cache line x.

Following the rebuild sequence of FIG. 6A to FIG. 6B, cache $104_2$ or $204_2$ erasure encodes a modified copy of cache line x' and sends the data portions and the parity portion for cache line x' for storage in the corresponding nodes of the blast zone with an incremented version number (i.e., v2). After storing the portions for cache line x and updating the version number in the state for the cache line, the shared memory 112 or memory unit 212 sends the first data portion requested for cache line x from the LPC node to the cache $104_1$ or $204_1$ and sends the parity portion for cache line x from the parity node to the cache $104_1$ or $204_1$. In some implementations, the cache $104_1$ or $204_1$ may send an additional get shared request for the parity portion, as indicated by the dashed arrow in FIG. 6B. Cache $104_1$ or $204_1$ then decodes the updated cache line x for read-only processing by an associated processor.

Those of ordinary skill in the art will appreciate with reference to the present disclosure that the example rebuild sequence of FIGS. 6A and 6B is for the purposes of illustration and that other implementations may differ. For example, other rebuild sequences may include a different number of nodes than shown in FIGS. 6A and 6B or may involve rebuilding the LPC node, which may further delay the performance of deferred requests until after the completion of reconstructing all of the data for the LPC node.

Figure 7:
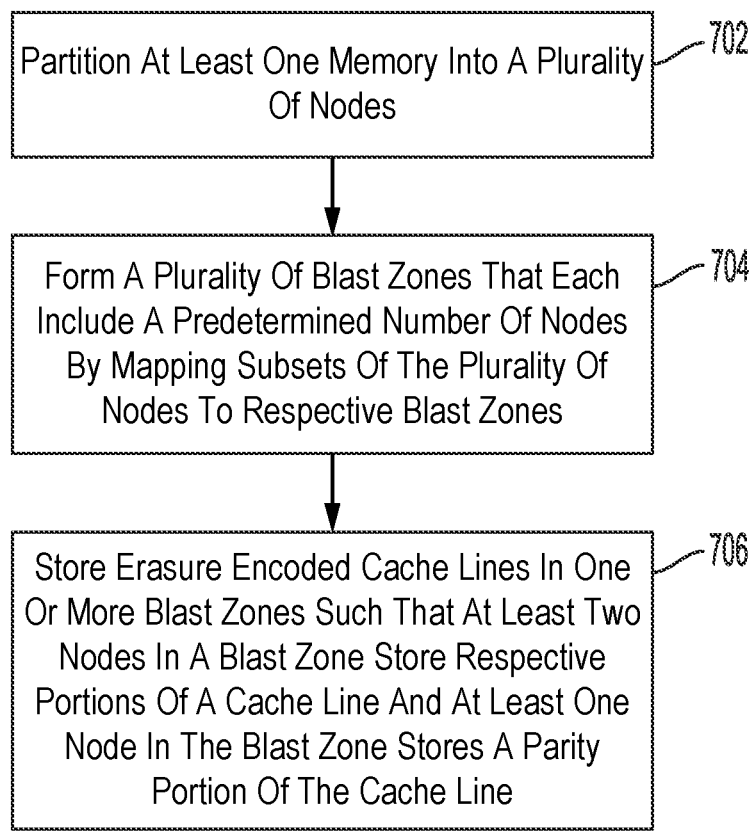
FIG. 7 is a flowchart for a memory configuration process according to one or more embodiments.

FIG. 7 is a flowchart for a memory configuration process according to one or more embodiments. The memory configuration process of FIG. 7 can be performed by, for example, memory controller 114 in FIG. 1 or at least one memory controller 214 in FIG. 2.

In block 702, the memory controller partitions at least one memory into a plurality of nodes of a predetermined size. The partitioning may be accomplished, for example, by logically dividing a portion of the at least one memory allocated for shared use by the system into equally sized physical memory regions.

In block 704, the memory controller forms a plurality of blast zones that each include a predetermined number of nodes from the partitioning in block 702. The predetermined number of nodes in each blast zone corresponds to the total number of data portions and parity portions that will be used to erasure encode the cache lines to be stored in each blast zone. The cache lines can have a fixed size for use by processors in the system, such as a fixed number of bytes in the range of 16 bytes to 256 bytes, and the blast zones can be sized to store up to a predetermined number of erasure encoded cache lines. The partitioning of the at least one memory in block 702 can take this blast zone sizing and the number of portions for erasure encoding into account when determining the predetermined size of each node.

The nodes assigned to the blast zone may be located in different areas of the at least one memory, such as to provide a more robust fault tolerance since different physical areas of memory may be more prone to failure or wearing out prematurely. As discussed above, the blast zones may be sized based on an access density of the blast zone to facilitate rebuilding one or more nodes of the blast zone within a threshold time, which may be based on a QoS for the system. The formation of the blast zones in block 704 can include, for example, mapping physical addresses for the nodes to logical identifiers or logical addresses for the blast zones and/or nodes.

In block 708, the memory controller stores erasure encoded cache lines in one or more blast zones such that at least two nodes in a blast zone store respective portions of a cache line and at least one node in the blast zone stores a parity portion of the cache line. In addition, and as discussed above, one of the nodes in each blast zone can serve as an LPC for tracking the states of any copies of cache lines throughout the system. The independent data recovery of each blast zone enables a faster recovery due to the smaller size of the blast zones as compared to checkpointing an entire memory and restoring data from a storage device for a larger memory region.

In addition, the independent coherence tracking of each blast zone facilitates a temporary pause in performing new memory requests while the blast zone is rebuilt without incurring a significant penalty since the size of the blast zone can be set based on a time to rebuild one or more nodes (e.g., a 1 ms rebuild time). This use of coherence tracking and data recovery at a smaller blast zone level can improve the scalability of memory coherence and fault tolerance because the time to track coherence and recover data is generally limited to a fixed blast zone size regardless of the overall size of the system. Advantageously, the down time to reconstruct data in large scale systems, such as in supercomputers and data centers is significantly decreased as compared to recovering checkpointed data for much larger regions of memory.

Those of ordinary skill in the art will appreciate with reference to the present disclosure that the memory configuration process of FIG. 7 may be performed in a different order. For example, more blast zones may be added in block 704 after storing erasure encoded cache lines in block 706 to increase the available memory capacity for the system. In addition, more portions of memory may be partitioned into nodes in block 702 for the formation of additional blast zones in block 704.

Figure 8:
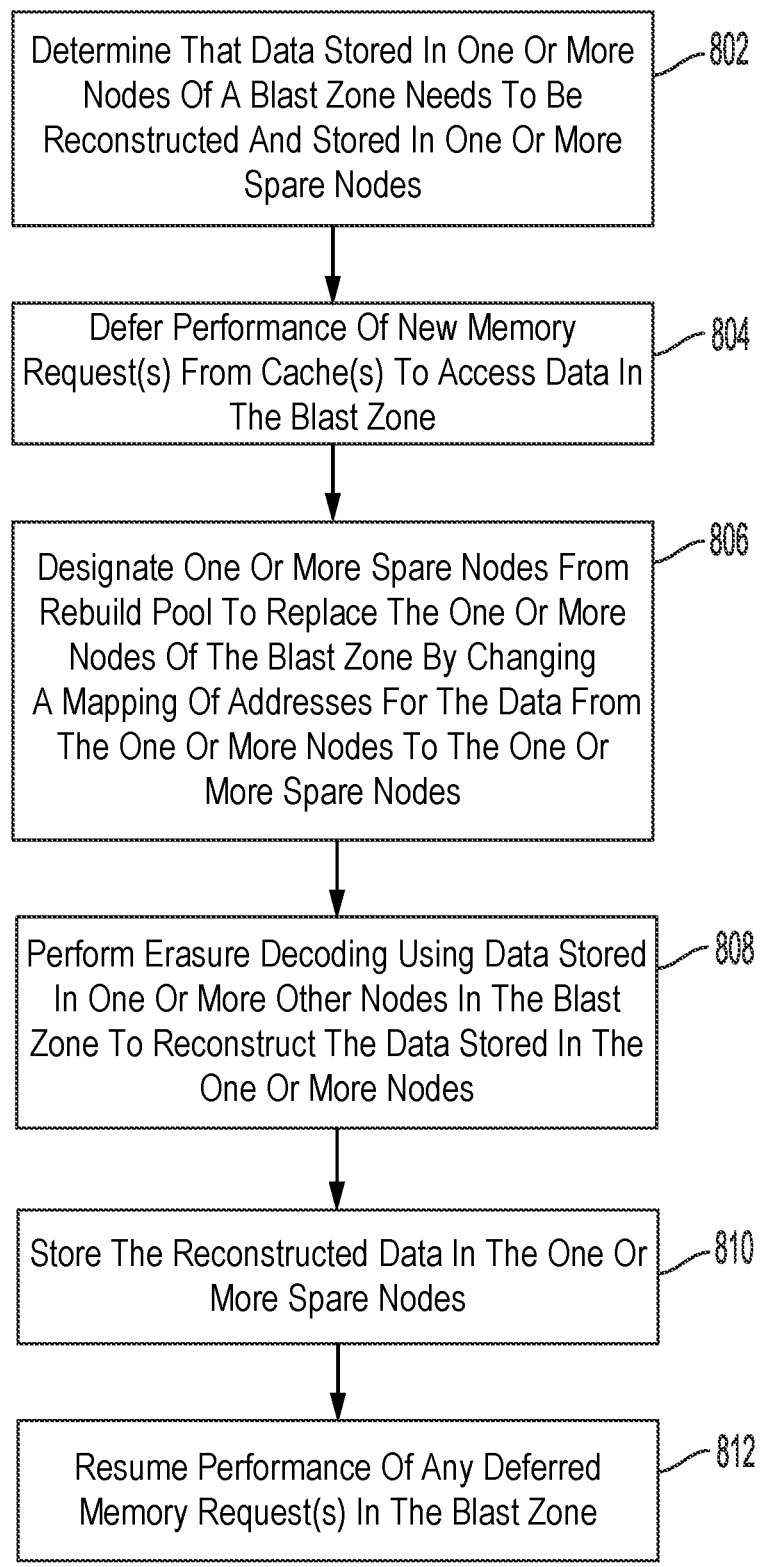
FIG. 8 is a flowchart for a rebuild process according to one or more embodiments.

FIG. 8 is a flowchart for a rebuild process according to one or more embodiments. The rebuild process of FIG. 8 can be performed by, for example, memory controller 114 in FIG. 1 or at least one memory controller 214 in FIG. 2 in conjunction with at least one cache controller 106 in FIG. 1 or at least one cache controller 206 in FIG. 2.

In block 802, the memory controller determines that data stored in one or more nodes in a blast zone needs to be reconstructed and stored in one or more nodes from a rebuild pool in at least one memory. The determination can be based on, for example, at least one of a useable life expectancy for the one or more nodes and a failure indication from attempting to access data stored in the one or more nodes.

In this regard, a cache requesting access to the data can initiate the rebuild process by sending a message to the shared memory or memory unit indicating that a request for the one or more nodes has timed out for requested data or for an acknowledgment that data has been stored in the one or more nodes. In some implementations, this may occur after the requesting cache has attempted at least one retry by resending its request.

In addition, the memory controller may initiate the rebuild process, such as when not being able to read or write data from the one or more nodes, which may follow attempts to error correct the data using ECC or attempts to retry the read or write operation. In such cases, the memory controller may use at least one of a predetermined number of retry attempts and a timeout value for accessing the data. The memory controller may also initiate a rebuild of one or more nodes based on life expectancy information, such as at least one of number of read or write operations performed in the one or more nodes, a change in a threshold voltage needed to read or write data in the one or more nodes, a latency in accessing data in the one or more nodes, and/or an error rate in data stored or retrieved from the one or more nodes.

In block 804, the memory controller defers the performance of any new memory requests from caches to access data in the blast zone. As discussed above with reference to the rebuild sequence of FIGS. 6A and 6B, the blast zone is sized so that the deferring of new memory requests does not significantly delay operation of the system. Any new memory requests received from the caches may be buffered in the shared memory or memory unit to be performed after the entire node or nodes have been rebuilt in the case where an LPC node is being rebuilt or after the particular cache line or cache lines of the deferred request has been reconstructed in the rebuilt node(s) in the case where the LPC node is not being rebuilt. In addition, the memory controller may discard repeated memory requests for the same cache line(s) from the same cache so that the deferred requests can be performed in the order in which they were received after the data has been reconstructed and to conserve space in any buffers that may be used to defer the new requests.

In some cases, the performance of at least one memory request is deferred since an initial memory request from a cache may initiate the rebuild process. The first memory request that triggers the determination that data stored in the one or more nodes needs to be reconstructed is then considered the first deferred memory request. In other implementations, such as where the memory controller initiates the rebuild process on its own without receiving a memory request from a cache, there may not be any deferred memory requests in block 804.

In block 806, the memory controller designates one or more spare nodes from a rebuild pool of the at least one memory to replace the one or more nodes of the blast zone being rebuilt. The designation can be made by changing a mapping, such as a routing table, to replace a physical address or addresses for the one or more nodes being rebuilt with a physical address or addresses for the one or more spare nodes. Since multiple caches and/or the memory controller may initiate the rebuild process as discussed above for block 802, the memory controller serializes the designation of each spare node by selecting a first spare node in the rebuild pool and disregards additional messages to rebuild the same node.

In block 808, erasure decoding is performed using data stored in one or more other nodes in the blast zone to reconstruct the data stored in the one or more nodes being rebuilt. As discussed above with reference to the rebuild sequence of FIGS. 6A and 6B, the memory controller can recruit caches that request access to data in the blast zone to reconstruct the data for the node or nodes being rebuilt. This improves the efficiency of the rebuild process since the processors instructing the requesting caches would otherwise stall or encounter delays by not having access to data in the blast zone while the node(s) are being rebuilt.

The memory controller can send a reconstruct message for a cache line to the requesting cache in response to receiving a request from the cache during the rebuild process. A cache controller of the cache can then erasure decode the portions or portions of the cache line to be reconstructed using data from the remaining nodes in the blast zone. In some cases, only one cache may end up reconstructing all the data for the rebuilt node(s) if no other caches are sending memory requests during the rebuild process. In other implementations, the memory controller or other hardware of the shared memory or memory unit (e.g., a hardware accelerator such as a GPU) may reconstruct data if no other caches request data or to otherwise speed up the rebuild process.

In block 810, the reconstructed data is stored in the one or more spare nodes. As discussed above with reference to the rebuild sequence of FIGS. 6A and 6B, the cache or caches that have been recruited to reconstruct the data may send the cache line portions as they are reconstructed. The memory controller may then update a count or other indicator, such as an indication in the state of the cache line in the LPC node to indicate that reconstruction of the cache line has been completed.

In block 812, the memory controller resumes performance of any deferred memory requests in the blast zone. In cases where the LPC node was not rebuilt, the resumption of deferred memory requests may occur after the requested cache line has been reconstructed. In such cases, the performance of certain memory requests may occur while other cache lines are still being reconstructed. In cases where the LPC node was rebuilt, the resumption of the deferred memory requests may occur after all the cache lines for the blast zone have been reconstructed. After all the cache lines have been reconstructed and all the unique deferred memory requests (i.e., not including repeated memory requests from the same cache) have been performed in the order the requests were initially received, the operation of the blast zone returns to normal without deferring performance of any further new memory requests.

Those of ordinary skill in the art will appreciate with reference to the present disclosure that other implementations of the rebuild process of FIG. 8 may differ. For example, other implementations may omit the deferral of new memory requests in block 804 where the rebuild process is initiated without receiving a memory request from a cache and no new memory requests are received throughout the rebuild process. In such implementations, the memory controller may reconstruct the data on its own or may recruit caches for reconstructing data on a basis other than the origination of memory requests, such as based on a past history of access of the blast zone by the recruited caches.

The foregoing fault tolerance and memory coherence arrangements and operations can reduce the latency and storage footprint otherwise needed to maintain fault tolerant and coherent data in large-scale systems. In one aspect, the independent blast zones storing erasure coded cache lines can provide a lower storage overhead as compared to checkpointing an entire redundant copy of the cache lines. In another aspect, the performance penalty for reconstructing data in each independent blast zone is compartmentalized or limited to the blast zone, which can be sized based on an acceptable performance penalty for rebuilding one or more nodes. Similarly, the performance cost in maintaining coherence of the cache lines in large scale systems is also compartmentalized, which generally improves scalability of the system. In addition, the foregoing fault tolerance and memory coherence operations can significantly reduce downtime in large-scale systems, such as supercomputers and data centers, since the independent blast zones are relatively small and scalable as compared to conventional coherence and fault tolerance methods used for system memory.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A system, comprising:
   at least one memory configured to store cache lines; and
   one or more memory controllers, individually or in combination, configured to:
      partition the at least one memory into a plurality of nodes;
      form a plurality of blast zones that each include a predetermined number of nodes from the plurality of nodes; and
      store erasure encoded cache lines in one or more blast zones such that at least two nodes in a blast zone store respective portions of a cache line and at least one node in the blast zone stores a parity portion of the cache line; and
      wherein a memory controller of the one or more memory controllers is further configured to:
         defer performance of a new memory request received from a cache to access data in the blast zone in response to determining that data stored in one or more nodes of the blast zone needs to be reconstructed and stored in one or more spare nodes of the plurality of nodes; and
         resume the performance of the deferred memory request in the blast zone in response to completion of storing the reconstructed data in the one or more spare nodes.

2. The system of claim 1, wherein the blast zone is sized based at least in part on a time to read data from or write data to an entire capacity of the blast zone.

3. The system of claim 1, further comprising at least one cache controller, individually or in combination, configured to:
   erasure encode cache lines to be stored in the one or more blast zones;
   perform erasure decoding using data stored in one or more other nodes in the blast zone to reconstruct the data stored in the one or more nodes; and
   store the reconstructed data in the one or more spare nodes.

4. The system of claim 1, wherein the memory controller is further configured to determine that the data stored in the one or more nodes needs to be reconstructed and stored in the one or more spare nodes based on at least one of a usable life expectancy for the one or more nodes and a failure indication from attempting to access data stored in the one or more nodes.

5. The system of claim 3, wherein the memory controller is further configured to:
   receive, from the at least one cache controller, one or more memory requests to access data stored in the one or more nodes; and
   in response to receiving the one or more memory requests, assign the at least one cache controller to reconstruct the data stored in the one or more nodes.

6. The system of claim 1, wherein the memory controller is further configured to serialize performance of memory requests to access cache lines in each blast zone of the plurality of blast zones.

7. The system of claim 1, wherein the memory controller is further configured to send invalidation messages for data stored in the one or more nodes of the blast zone to at least one cache controller in response to determining that data stored in the one or more nodes of the blast zone needs to be reconstructed and stored in the one or more spare nodes of the plurality of nodes.

8. The system of claim 1, wherein a node of the blast zone is a Lowest Point of Coherence (LPC) for the cache lines stored in the blast zone by tracking a state of each cache line stored in the blast zone.

9. The system of claim 1, wherein the one or more memory controllers, individually or in combination, are further configured to map subsets of the plurality of nodes to respective blast zones of the plurality of blast zones to form the plurality of blast zones.

10. The system of claim 1, further comprising at least one cache controller configured to determine whether data received from a node of the blast zone for erasure decoding the cache line is valid by comparing a version number for the received data with another version number for other data received from another node of the blast zone for erasure decoding the cache line.

11. A method, comprising:
  determining that data stored in one or more nodes of a blast zone in at least one memory needs to be reconstructed and stored in one or more spare nodes of the at least one memory, wherein the blast zone has a predetermined memory capacity and includes a number of nodes;
  designating the one or more spare nodes of the at least one memory to replace the one or more nodes of the blast zone;
  performing erasure decoding using data stored in one or more other nodes in the blast zone to reconstruct the data stored in the one or more nodes; and
  storing the reconstructed data in the one or more spare nodes.

12. The method of claim 11, wherein at least two nodes in the blast zone store respective portions of a cache line and at least one node in the blast zone stores a parity portion of the cache line.

13. The method of claim 11, further comprising:
  deferring performance of a new memory request received from a cache to access data in the blast zone in response to determining that the data stored in the one or more nodes of the blast zone needs to be reconstructed and stored in the one or more spare nodes; and
  resuming the performance of the deferred memory request in the blast zone in response to completion of storing the reconstructed data in the one or more spare nodes.

14. The method of claim 11, further comprising determining that the data stored in the one or more nodes needs to be reconstructed and stored in the one or more spare nodes based on at least one of a usable life expectancy for the one or more nodes and a failure indication from attempting to access data stored in the one or more nodes.

15. The method of claim 11, wherein the erasure decoding is performed by at least one cache controller attempting to access data stored in the one or more nodes.

16. The method of claim 11, wherein a node of the blast zone is a Lowest Point of Coherence (LPC) for the cache lines stored in the blast zone by tracking a state of each cache line stored in the blast zone.

17. The method of claim 11, further comprising changing a mapping of addresses for the data from the one or more nodes to the one or more spare nodes.

18. The method of claim 11, wherein the blast zone is sized based at least in part on a time to read data from or write data to an entire capacity of the blast zone.

19. The method of claim 11, further comprising determining whether data received from a node of the blast zone for erasure decoding a cache line is valid by comparing a version number for the received data with another version number for other data received from another node of the blast zone for erasure decoding the cache line.

20. A system, comprising:
  at least one memory configured to store cache lines; and
  means for:
    partitioning the at least one memory into a plurality of nodes;
    forming a plurality of blast zones that each include a predetermined number of nodes from the plurality of nodes;
    storing erasure encoded cache lines in one or more blast zones of the plurality of blast zones such that at least two nodes in a blast zone store respective portions of a cache line and at least one node in the blast zone stores a parity portion of the cache line;
    deferring performance of a new memory request received from a cache to access data in the blast zone in response to determining that data stored in one or more nodes of the blast zone needs to be reconstructed and stored in one or more spare nodes of the plurality of nodes; and
    resuming the performance of the deferred memory request in the blast zone in response to completion of storing the reconstructed data in the one or more spare nodes.

* * * * *